(12) United States Patent
Azzari et al.

(10) Patent No.: US 10,654,323 B2
(45) Date of Patent: May 19, 2020

(54) METHOD AND APPARATUS FOR UNIQUELY IDENTIFYING TYRES FOR WHEELS OF VEHICLES AS PART OF VEHICLE WHEEL MAINTENANCE PROCESSES

(71) Applicant: Snap-on Equipment S.r.l., Correggio (RE) (IT)

(72) Inventors: Pietro Azzari, Gonzaga (IT); Lillo Gucciardino, Bomporto (IT); Paolo Sotgiu, Modena (IT); Marco Tralli, Modena (IT)

(73) Assignee: SNAP-ON EQUIPMENT S.R.L., Correggio (RE) (IT)

( * ) Notice: Subject to any disclaimer, the term of this patent is extended or adjusted under 35 U.S.C. 154(b) by 0 days.

(21) Appl. No.: 15/646,882

(22) Filed: Jul. 11, 2017

(65) Prior Publication Data

US 2018/0015795 A1 Jan. 18, 2018

(30) Foreign Application Priority Data

Jul. 13, 2016 (IT) .......................... 102016000072749

(51) Int. Cl.
*B41J 2/44* (2006.01)
*B60C 25/05* (2006.01)
(Continued)

(52) U.S. Cl.
CPC ........... *B60C 25/0554* (2013.01); *B41J 2/442* (2013.01); *B41J 3/4073* (2013.01); *G01M 1/045* (2013.01);
(Continued)

(58) Field of Classification Search
CPC ..... B41J 2/435; B41J 2/442; B41J 2/47; B41J 3/4073; B60C 25/0554; B60C 13/001;
(Continued)

(56) References Cited

U.S. PATENT DOCUMENTS 5,527,407 A 6/1996 Gartland et al.
7,738,120 B2 6/2010 Braghiroli
(Continued)

FOREIGN PATENT DOCUMENTS

EP 0 604 819 A2 7/1994
EP 1 207 061 A2 5/2002
(Continued)

OTHER PUBLICATIONS

"Scannect-Total Tire Traceability-Tire Wheel Assembly," May 30, 2016, https://web.archive.org/web/20160530191504/http://www.scannection.de:80/tirewheelass/index.html, XP002776015.
(Continued)

*Primary Examiner* — Kristal Feggins
(74) *Attorney, Agent, or Firm* — McDermott Will & Emery LLP (57) ABSTRACT

A method and associated apparatus for uniquely identifying tyres for wheels of vehicles as part of wheel maintenance processes. The method envisages that a vehicle wheel is mounted on a support of a wheel maintenance apparatus, said wheel comprising a rim and a tyre. Moreover, a digital code is created to uniquely identify the tyre. Finally, via a marking system, preferably of the optical type, at least one marking is created on the surface of one side wall of the tyre of said wheel, corresponding to the previously created digital code.

20 Claims, 3 Drawing Sheets

(51) Int. Cl.
*G09F 3/00* (2006.01)
*G06K 7/10* (2006.01)
*G06K 19/06* (2006.01)
*B41J 3/407* (2006.01)
*G01M 1/04* (2006.01)
*B60C 25/138* (2006.01)
*B29D 30/72* (2006.01)
*B60C 13/00* (2006.01)

(52) U.S. Cl.
CPC ... *G06K 7/10861* (2013.01); *G06K 19/06037* (2013.01); *G09F 3/0297* (2013.01); *B29D 2030/728* (2013.01); *B60C 13/001* (2013.01); *B60C 25/138* (2013.01)

(58) Field of Classification Search
CPC .............. B60C 25/138; G01M 1/045; B29D 2030/728; G09F 3/0297; G06K 19/06037; G06K 7/10861
See application file for complete search history.

(56) References Cited

U.S. PATENT DOCUMENTS

| | | |
|---|---|---|
| 7,772,521 B2 | 8/2010 | Smith, Jr. et al. |
| 8,342,222 B2 | 1/2013 | Braghiroli et al. |
| 2003/0084977 A1 | 5/2003 | Gonzaga |
| 2004/0134983 A1* | 7/2004 | Oyama ............... B29D 30/0061 235/385 |
| 2006/0151451 A1 | 7/2006 | Smith, Jr. et al. |
| 2009/0033949 A1 | 2/2009 | Braghiroli |
| 2011/0174446 A1 | 7/2011 | Braghiroli et al. |
| 2014/0270466 A1* | 9/2014 | Dam ................... G01M 17/027 382/141 |
| 2017/0011666 A1 | 1/2017 | Kraus |

FOREIGN PATENT DOCUMENTS

| | | | |
|---|---|---|---|
| EP | 2020594 A1 | 2/2009 | |
| EP | 2 347 919 A1 | 7/2011 | |
| EP | 2 905 125 A1 | 8/2015 | |
| EP | 2905125 * | 8/2015 | ............. B29D 30/72 |
| EP | 2 977 934 A1 | 1/2016 | |
| WO | 2005/000714 A1 | 1/2005 | |

OTHER PUBLICATIONS

Extended European Search Report issued in corresponding European Patent Application No. 17177921.8, dated Dec. 12, 2017.

* cited by examiner

METHOD AND APPARATUS FOR UNIQUELY IDENTIFYING TYRES FOR WHEELS OF VEHICLES AS PART OF VEHICLE WHEEL MAINTENANCE PROCESSES

CROSS-REFERENCE TO RELATED APPLICATION

This application claims the benefit of priority to Italian Patent Application No. 102016000072749 filed on Jul. 13, 2016 with the Italian Intellectual Property Office, the disclosure of which is incorporated herein by reference in its entirety.

FIELD OF THE INVENTION

The present invention relates to a method for uniquely identifying tyres for wheels of vehicles as part of wheel maintenance operations and a vehicle wheel maintenance apparatus capable of implementing said method. In particular, the present invention falls within the realm of apparatus used by tyre fitters in auto repair garages, such as, for example, tyre removal machines, balancing machines, etc. More in general, the present invention has application whenever a tyre mounted on a respective rim needs to be handled (checked, inspected, replaced).

STATE OF THE ART

Tyres for vehicle wheels exhibit, on one or both sides (as engraved and/or raised symbols applied on the elastomeric material), the manufacturer's trademark, numbers identifying the characteristics of the tyre itself (dimensions, load index and speed rating, etc.) and additional codes serving to indicate, for example, a certain type of certification, e.g. the DOT code, acronym of "Department of Transportation". The DOT code is composed of a reference symbol (DOT) and additional codes (groups of numbers and letters in sequence), which usually, but not necessarily, follow the DOT symbol, and serve to identify the tyre; for example, they serve to indicate the manufacturing plant, dimensions and type of tyre, and the date of manufacture thereof.

It is worth noting here that DOT codes do not represent actual serial numbers for identifying the individual tyres; in reality, they contain information serving simply to identify the entire production lot the tyre belongs to in order to manage any recall campaigns that might be decided by the manufacturer.

There also exist complex and costly camera and 3D laser-based systems capable of capturing and recognising the aforesaid codes, which further require a very precise, specific positioning of the cameras in order to obtain the desired results. Also known is document EP 2 020 594, which illustrates a method and an apparatus for determining the geometrical dimensions of a vehicle wheel. The apparatus is a balancing machine provided with a light source and a detector configured to detect a light beam emitted by the source and reflected from an area of the wheel surface. The apparatus further comprises an evaluation device connected to the detector and capable of determining the position and geometrical shape of the wheel area by means of a single point triangulation. The evaluation device can be used, for example, to detect the shape of the rim, the width of the rim and the letters and numbers on the side wall of the tyre.

Document EP 2 347 919 illustrates a method for mounting a tyre on a rim or demounting a tyre from a rim, wherein images of the wheel or the rim are created by a vision system and sent to a computer. The images are correlated with commands sent to a fitting or removal tool so as to define the position of the tool relative to the rim and guide the tool on the basis of this correlation.

Document WO 2005/000714 A1 discloses a system for marking tyres using laser beams, in the context of a tyre manufacturing process.

Document EP 0 604 819 A2 discloses a system for marking tyres by generating and printing a label that is subsequently transferred and made to adhere to the tyre.

Finally, document EP 1 207 061 A2 illustrates a machine for the maintenance of tyres comprising a device capable of reading and identifying any markings present on the tyre.

The Applicant has observed that, in garages where maintenance and/or preparation work is performed on vehicles, and in particular on the wheels thereof (tyre changes, wheel balancing, wheel alignment, etc.), there do not exist any systems integrated into the apparatus used (for example: tyre removal and balancing machines, vehicle lifts, etc.) capable of uniquely identifying the tyre through the use of any engraved and/or raised symbols applied on the elastomeric material of the tyre, and then transmitting the data thereof to the control system of the apparatus (and enabling, for example, an automatic correlation between the type of tyre and the adjustment parameters of the wheel maintenance process and/or to simplify storage of the tyres in a storeroom once they have been removed from the vehicle, etc.).

OBJECT OF THE INVENTION

In this context, the Applicant has set itself the objective of providing a simple and reliable method for uniquely identifying tyres for vehicle wheels by creating suitable markings on the tyre surface corresponding to respective digital codes uniquely identifying the specific tyre on which maintenance operations are performed in garages, so as to make said operations—including those related to storage of the tyres upstream and/or downstream of the maintenance operations in the garage—more simple, effective, precise, rapid and customisable.

The Applicant has also set itself the objective of providing a vehicle wheel maintenance apparatus, preferably used in garages where maintenance and/or preparation of the vehicles themselves takes place, which incorporates a device capable of suitably marking the tyre with a digital code uniquely identifying the latter, and of automatically sending the data contained in said code to the management system of the apparatus and/or of the garage. In particular, it is an object of the invention to provide an apparatus of such a type that is precise and reliable. It is also an object of the invention to provide a structurally simple and relatively inexpensive apparatus. It is moreover an object of the invention to provide an apparatus that is simple to manage and easy to maintain.

SUMMARY OF THE INVENTION

The Applicant has found that these objectives and aims can be achieved by integrating, into a vehicle wheel maintenance apparatus, a marking system operatively active at least on one surface of one side wall of the tyre and configured to mark said side wall with a marking corresponding to a unique digital code. The marking applied on the side wall of the tyre can then be detected by an optical vision system capable of reading the digital code and storing it in a database, which can then be shared with any apparatus for wheel maintenance and/or with any computerised system.

More specifically, in accordance with a first aspect, the present invention relates to a method for uniquely identifying tyres for wheels of vehicles as part of wheel maintenance processes, comprising the steps of:

mounting a wheel for vehicles on a support of an apparatus for maintenance of vehicle wheels, said wheel comprising a rim and a tyre;

creating a digital code for uniquely identifying said tyre;

creating, using a marking system, preferably of the optical type, at least one marking on the surface of a side wall of the tyre of said wheel, corresponding to the digital code previously created.

In accordance with a second aspect, the present invention relates to an apparatus for vehicle wheel maintenance, comprising:

a base;

a support mounted on the base and designed to receive and sustain a rim of a wheel of a vehicle;

a marking system, preferably of the optical type, operatively active on a surface of at least one side wall of the tyre of said wheel, for marking said at least one side wall of the tyre;

a control unit operatively connected to said marking system and designed for:

creating a digital code for uniquely identifying said tyre;

controlling the marking system so that it creates at least one marking on the surface of the side wall of the tyre of said wheel, corresponding to the digital code previously created.

The system for marking the side wall of the tyre can be of various types, e.g. mechanical, optical, etc. Preferably, the marking system is of an optical type, even more preferably it is a laser marking system.

In accordance with a third aspect, the present invention relates to a process for the maintenance of vehicle wheels comprising the method for identifying tyres according to the present invention.

The method for identifying tyres according to the invention enables tyres to be uniquely marked in concomitance with the operations of maintenance thereof in a simple, reliable and rapid manner, ensuring that each marking corresponds to a unique digital code, specific for each tyre. This code can be read and recognised by a suitable optical vision system, in order to subsequently identify the tyre thus marked. The tyre identification data can then be transmitted to the control unit of the maintenance apparatus or to other computers integrated into or external to the apparatus itself.

The apparatus according to the invention makes it possible to implement tyre identification while maintaining the structure of the overall apparatus relatively simple and compact. The apparatus according to the invention is thus also reliable and inexpensive in terms of purchase and maintenance costs.

In one aspect, the support suitable for receiving and supporting a rim of a vehicle wheel is mounted rotatably on the base of the vehicle wheel maintenance apparatus.

In one aspect, the apparatus comprises a motor operatively connected to the rotatable support and configured to rotate said rotatable support and the wheel about a main axis of said wheel.

In one aspect, the control unit is further configured to control the motor so that it rotates the rotatable support and the wheel.

In one aspect, the wheel is made to turn manually by an operator.

In one aspect, the wheel is set into rotation about a main axis thereof whilst said marking is created on the side wall of the tyre.

In one aspect, the wheel is stationary, i.e. it does not turn, whilst said marking is created on the side wall of the tyre.

In one aspect, the marking comprises at least a first portion of surface having a first optical reflectivity and at least a second portion of surface having a second optical reflectivity, said first optical reflectivity being different from the second optical reflectivity.

In one aspect, the marking comprises a plurality of engravings or recesses on the surface of the side wall of the tyre.

In one aspect, the digital code is of the two-dimensional type; preferably it is a QR code.

In one aspect, the digital code, in addition to uniquely identifying the tyre, further comprises at least one piece of information relating to the wheel maintenance process and/or the rim on which said tyre is mounted. For example, the digital code can comprise information about the type of process just carried out (mounting, removal, balancing, etc.), as well as on some characteristic parameters of the process itself.

The digital code can also comprise information as to the date when the tyre and/or the wheel on which said tyre is mounted underwent the maintenance process.

Furthermore, the digital code can also comprise information about the state of wear of the tyre and/or of the rim on which it is (or was) mounted, about the customer, etc.

Optionally, the digital code can also comprise further information, such as the name of the operator who performs the maintenance, the name and/or logo of the garage entrusted with performing the maintenance operation, and/or the name and/or logo of the distributor and/or manufacturer of the vehicle wheel maintenance apparatus.

In one aspect, the digital code for uniquely identifying the tyre is automatically created by the control unit of the vehicle wheel maintenance apparatus.

In one aspect, the digital code for uniquely identifying the tyre is created by the control unit of the vehicle wheel maintenance apparatus, based, however, on instructions sent to said control unit by an operator, who, optionally, can freely decide which type of coding to use, the possible structure and syntax thereof, and at least part or all of the contents of the information contained in the digital code.

In one aspect, the information included in the digital code, in addition to the information serving to uniquely identify the tyre, can also be automatically determined by the vehicle wheel maintenance apparatus.

In a further aspect, the information included in the digital code, in addition to the information serving to uniquely identify the tyre, can instead be manually entered, partly or totally, by an operator.

In one aspect, the optical vision system is capable of reading the marking on the surface of the side wall of the tyre and of recognising the corresponding digital code.

In one aspect, the optical vision system is mounted fixed to the vehicle wheel maintenance apparatus. In this case, the optical vision system can comprise any type of image sensor, for example a camera, an optical sensor of the CCD or CMOS type, etc. Preferably, but not necessarily, when the vision system is mounted integral with the wheel maintenance apparatus, the marking system and the optical vision system are integrated in a same optical marking and vision system.

In one aspect, the optical vision system is instead separate from the wheel maintenance apparatus and is included in a portable device, for example a smartphone or a tablet.

In one aspect, the portable device incorporating the optical vision system is capable of communicating, for example in a wireless mode, with the control unit of the vehicle wheel maintenance apparatus, and/or with a remote computerised system.

In one aspect, the control unit of the vehicle wheel maintenance apparatus is configured to control the optical vision system so as to read the marking on the surface of the side wall of the tyre.

In one aspect, the control unit is configured to recognise the digital code corresponding to the marking.

In one aspect, the optical vision system is capable of recognising the digital code corresponding to the marking, and of communicating this information to the control unit.

In one aspect, the control unit and/or the optical vision system are capable of communicating with a local or remote database in which the digital codes corresponding to an equal number of tyres are stored.

In one aspect, the database containing the digital codes is populated upon the creation thereof.

In one aspect, the database containing the digital codes is populated upon the reading thereof on the side wall of the tyres.

In one aspect, the database can contain both information related to the digital codes as created, for example by the control unit, and as actually read by the vision system.

In one aspect, the digital codes that may already be present in the database are compared with those obtained by the vision system, in order to verify the correspondence thereof.

In one aspect, the control unit and/or the optical vision system is capable of sharing at least one portion of said database with any vehicle maintenance apparatus, for example with the apparatus on which the wheel undergoing the maintenance operation is mounted, or with other apparatus present locally in the same garage or also in a remote location.

In one aspect, the control unit and/or the optical vision system is capable of sharing at least one portion of said database with any computerised system, for example locally located in the apparatus that is performing the maintenance operation on the wheel to be treated, or else also remote, for example a computerised system for managing a plurality of wheel maintenance apparatus, a storeroom for the storage of tyres, a list of customers and/or suppliers, etc.

In one aspect, the at least one portion of database can be shared in a wired or wireless mode.

In a different aspect, the apparatus is a device for mounting tyres on a rim and/or demounting tyres from a rim.

In one aspect, the apparatus is a wheel balancer.

In one aspect, the apparatus is a tyre removal machine.

In one aspect, the process comprises: balancing the wheel.

In one aspect, the process comprises: mounting a tyre on a rim and/or removing a tyre from a rim In one aspect, the apparatus is a vehicle lift.

In one aspect, the process comprises: determining the alignment of at least one wheel of the vehicle.

BRIEF DESCRIPTION OF THE DRAWINGS

Additional features and advantages will become more apparent from the detailed description of preferred, but non-exclusive embodiments of a method and apparatus for vehicle wheel maintenance in accordance with the present invention. This description will be given below with reference to the attached drawings, provided solely for illustrative and therefore non-limiting purposes, in which.

DETAILED DESCRIPTION OF PREFERRED EMBODIMENTS OF THE INVENTION

In the description that follows, any expressions used, for example "right", "left", "above", "below", "upper", "lower" and the like, have a merely illustrative purpose and refer to the particular arrangement of the elements present in the appended figures, and do not, therefore, have any limiting character.

With reference to the appended figures, 1 denotes in its entirety a vehicle wheel maintenance apparatus.

Figure 1:
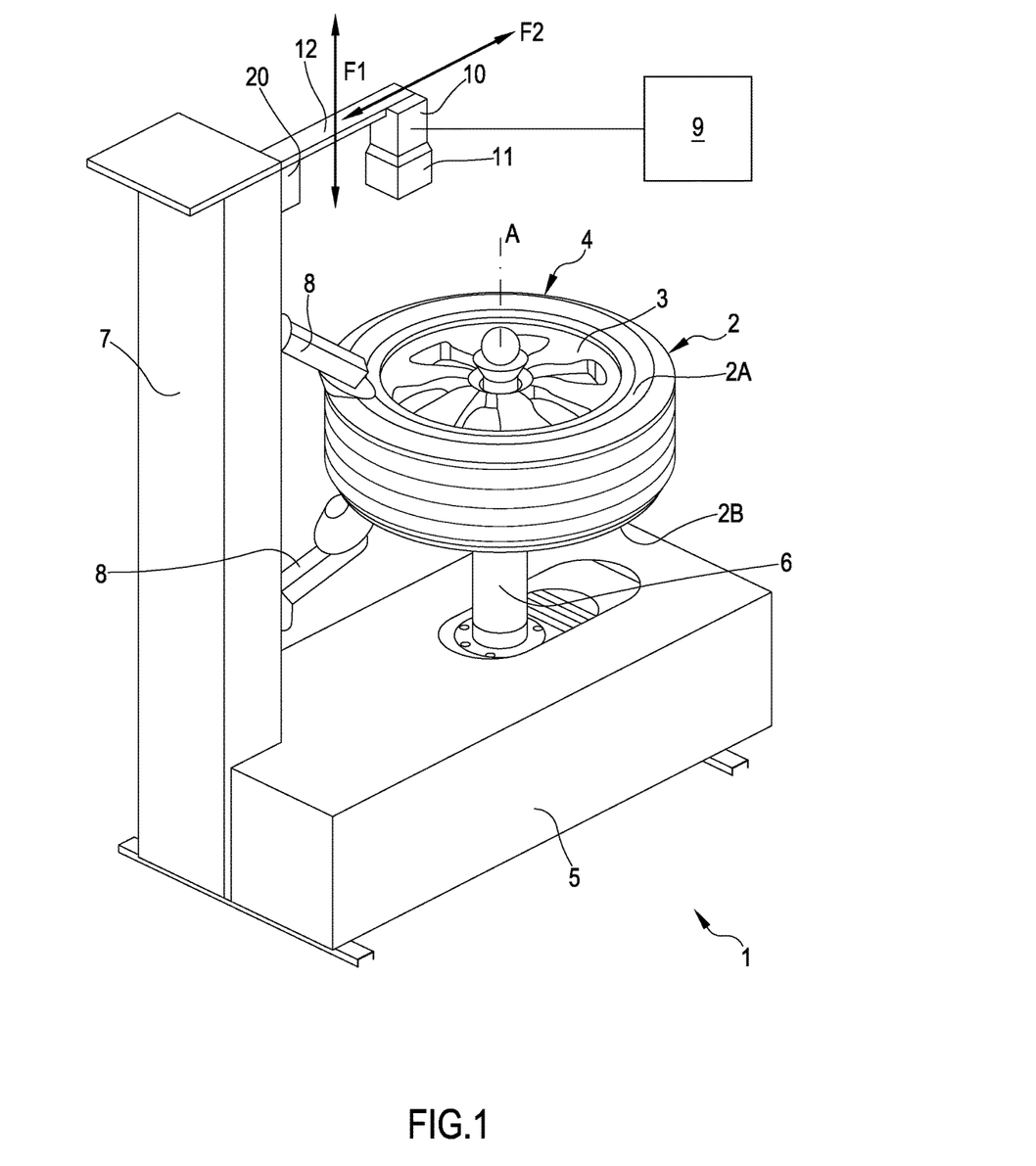
FIG. 1 shows a first embodiment of the apparatus according to the invention.

The apparatus 1 illustrated in FIG. 1 is a device for mounting tyres 2 on a rim 3 of a wheel 4 and/or demounting tyres 2 from a rim 3. The apparatus 1 comprises a base 5 intended to rest on the ground. Mounted on the base 5 there is a rotatable support 6 defined by a vertical shaft, at the upper end of which there is disposed a support means, not illustrated in detail and known per se, such as, for example, a support plate intended to receive and support the rim 3 of the wheel 2, and a locking means, not illustrated in detail and known per se, which enables the rim 3 to be solidly constrained to the shaft 6. The shaft 6 is rotatable on the base 5 about a main axis A thereof and is connected to an electric motor, for example inside a casing of the base 5 and not illustrated. The motor is configured to rotate the shaft 6 and the wheel 4 together about the main axis A of the shaft 6 (which coincides with the main or rotation axis of the wheel 4). The base 5 comprises a column 7 that extends vertically. The column 7 is substantially parallel to the shaft 6 and carries at least one mounting and removal tool 8, known per se and not described in detail, suitable for removing and mounting a tyre 2 from/on the rim 3. The mounting and removal tool 8 is configured to come into contact with the sides of the tyre 2 from below and/or above in proximity to the beads of the tyre 2 which, when said tyre 2 is mounted on the rim 3, lie behind two containing flanges belonging to the rim 3 itself.

An actuator, known per se and not illustrated, is operatively connected to the mounting and removal tool 8 and is connected to a control unit 9 of the apparatus 1. The control unit 9 is configured to send command signals to the actuator so as to control the mounting and removal tool 8 in order to demount or mount a tyre 2 from/on the rim 3. This operation is managed by an operator via a user interface (comprising, for example, buttons, pedals, touch screens, etc.) connected to the control unit and not illustrated.

The apparatus 1 further comprises a laser marking system 10, connected to the control unit 9, to generate a plurality of engravings on the side wall 2A of the tyre 2. Such systems are known in the art; for example, use could be made of a T-Mark Compact laser marking system, sold by the company 4JET Technologies GmbH. The laser marking system 10 is mounted on an arm 12 projecting from the column 7 above the wheel 4 when the latter is mounted on a support means. The laser marking system 10 is aimed downwards so as to frame an area of the surface of the upper side wall 2A of the tyre 2. The laser marking system 10 can be moved along the longitudinal direction F2 of the arm 12, so as to be able to operate on a tyre 2 of any type and size.

The arm 12 is preferably supported by a carriage 20 movable parallel to the column 7, along the direction F1. In this manner the laser marking system 10 can also be moved in turn relative to the base 5, so as to be able to come sufficiently close to the side wall 2A of the tyre 2 during the marking step, and be moved away once the marking has been performed so as not to be a hindrance for the subsequent maintenance operations the wheel 4 undergoes.

Both movements along the directions F1 and F2 can take place manually through the direct intervention of an operator, or else automatically; for example, they can be controlled by the control unit 9, which can be configured to receive input data regarding the dimensions of the wheel and/or tyre and/or the step of the wheel maintenance process it is desired to implement, and adjust, accordingly, the position of the laser marking system 10 along both directions F1 and F2, or also relative to only one of them (in the latter case the position of the laser marking system 10 along the remaining direction will be manually adjusted by the operator).

The laser marking system 10 generally also comprises a screen 11 to adequately protect the operator and evacuate fumes, vapours or residues generated by the engraving process.

In the embodiment of FIG. 1, the laser marking system 10 is capable of operating only on the upper side wall 2A of the tyre.

In reality, the laser marking system 10 can be alternatively mounted so as to be able to operate on the lower side wall 2A of the tyre 2, just as it is possible to envisage the use of two laser marking systems 10, one capable of operating on the upper side wall 2A and one capable of operating on the lower side wall 2A of the tyre 2.

Optionally, it might be envisaged to use a special movement and support means, not illustrated, capable of positioning a single laser marking system 10 both above and below the tyre 2. In this manner, the single laser marking system 10 that the apparatus 1 would be endowed with could in any case be capable of operating on both sides 2A, 2B of the tyre 2.

The laser marking system 10 is operatively connected to the control unit 9 which controls the mounting and demounting tool 8, as in the example illustrated, or to a different control unit, not illustrated.

Figure 4:
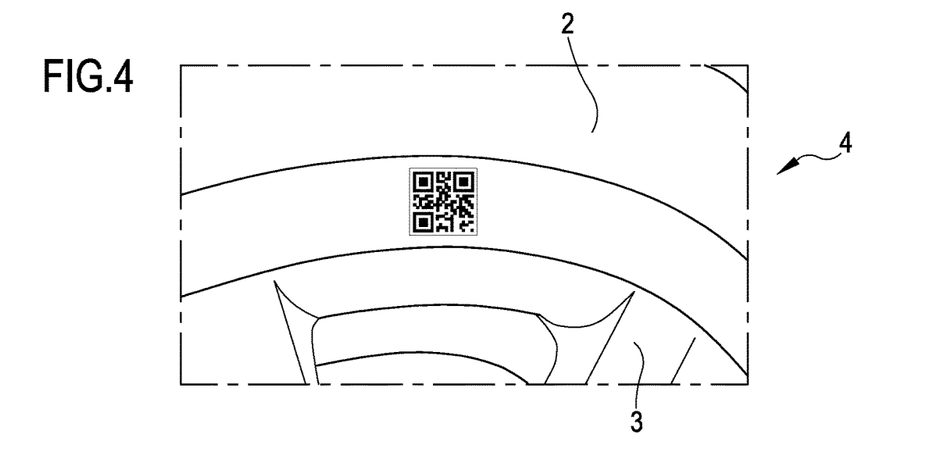
FIG. 4 illustrates a side wall of a tyre marked with a QR code.

The control unit 9 is capable of creating a digital code for uniquely identifying the tyre 2, preferably a two-dimensional code. In FIG. 4, the two-dimensional digital code is represented as a QR code (acronym for "Quick Response").

This code can be automatically or semi-automatically created by the control unit, or else it can be manually entered by an operator, for example through a specific input means such as a keyboard, a touch screen, etc. (not illustrated).

The digital code is then transmitted by the control unit to the laser marking system 10, in order to be subsequently engraved in the form of a marking on the side wall of the tyre.

Said marking preferably comprises at least a first portion of surface having a first optical reflectivity and at least a second portion of surface having a second optical reflectivity, said first optical reflectivity being different from the second optical reflectivity.

Such processes are known per se and described, for example, in the patent publications EP 2 905 125 and EP 2 977 934.

In accordance with the method according to the invention, the wheel 4, complete with the rim 3 and tyre 2, is mounted on the support 6. Before the tyre 2 is demounted from the rim 3 or after the tyre 2 has been mounted on the rim 3, by means of the mounting and removal tool 8 and in a manner known per se, the control unit 9 generates a digital code for uniquely identifying the tyre 2.

This digital code is communicated to the laser marking system 10, which, movable along the directions F1 and F2, is positioned by an operator, or is positioned automatically if suitably controlled by the control unit 9 via a suitable actuator means known per se and not illustrated, from a rest position, wherein said laser marking system 10 is away from the tyre to be marked, into an operative position sufficiently close to the tyre 2 so as to be able to perform said marking.

The marking is then engraved, by means of the laser light source, on the surface of the side wall of the tyre in the form of a plurality of engravings or recesses, representing at least one QR code.

The QR codes engraved on the side wall of the tyres can later be read by an optical vision system, comprising at least one camera and suitable recognition software. Such systems are known per se; reference may be made, for example, to the system called SCANNECT developed by the company 4JET Technologies GmbH.

Said optical vision system can be directly mounted on the apparatus 1 (solution not illustrated in the figures) or, alternatively, it can be compressed in a portable device, for example in a common smartphone or tablet.

The codes read are then sent, for example, to management software operating on a remote computer and used to manage the storeroom of a garage.

Figure 3:
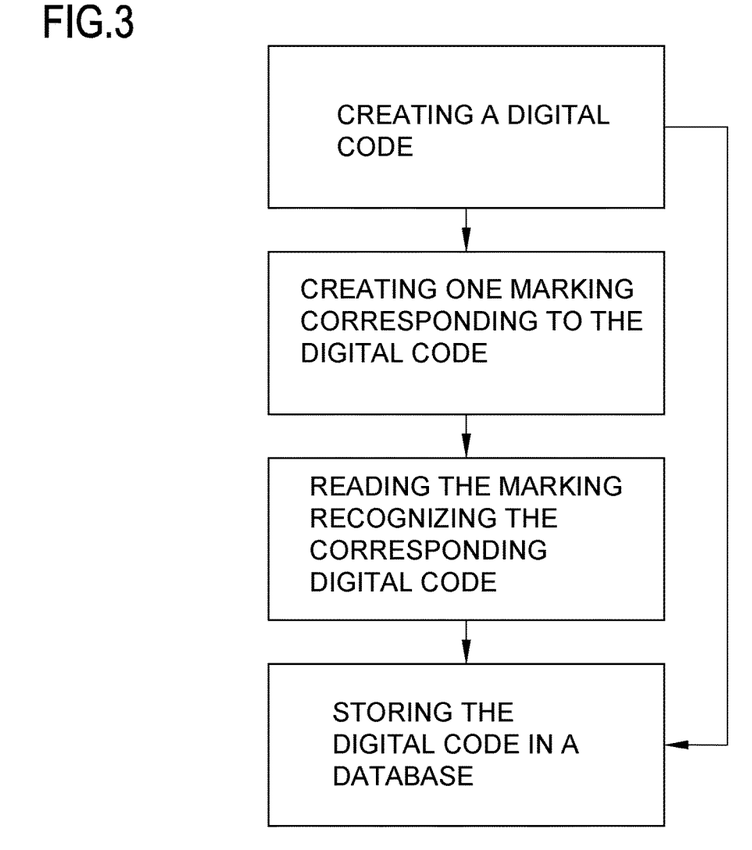
FIG. 3 illustrates a block diagram of a method for uniquely identifying tyres according to the invention.

In particular, as schematically represented in FIG. 3 and in accordance with the method of the invention, the control unit 9:
1. creates a digital code for uniquely identifying a tyre.

Subsequently, the marking system:
2. creates at least one marking on the surface of the side wall of the tyre, corresponding to the previously created digital code.

Subsequently, the vision system is optionally capable of:
3. reading the marking on the surface of the side wall of the tyre and recognising the corresponding digital code.

This third step of the method according to the invention can be performed by the vision system on its own or in cooperation between the vision system and the control unit of the wheel maintenance apparatus, both in the event that the vision system is integrated into the apparatus itself and in the event that it is incorporated in a portable device like a smartphone or tablet.

The control unit of the vehicle wheel maintenance apparatus, which may be connected to the vision system, but not necessarily, is finally optionally capable of:
4. storing the digital code in a local or remote database, and sharing at least one portion of said database with at least one further vehicle wheel maintenance apparatus and/or with at least one local and/or remote computerised system.

Moreover, the fourth and last step of the method indicated above can be equally well performed by the control unit of the wheel maintenance apparatus or by the portable device (smartphone, tablet), or by a local and/or remote computerised system, separately and/or in cooperation with one another.

The database containing the digital codes can also be initially populated at the time of creation of the same, or prior to the marking and/or reading steps. In this case, the reading step will serve to retrieve codes that will preferably then be compared with those previously stored in the database, in order to verify the exact correspondence thereof.

Figure 2:
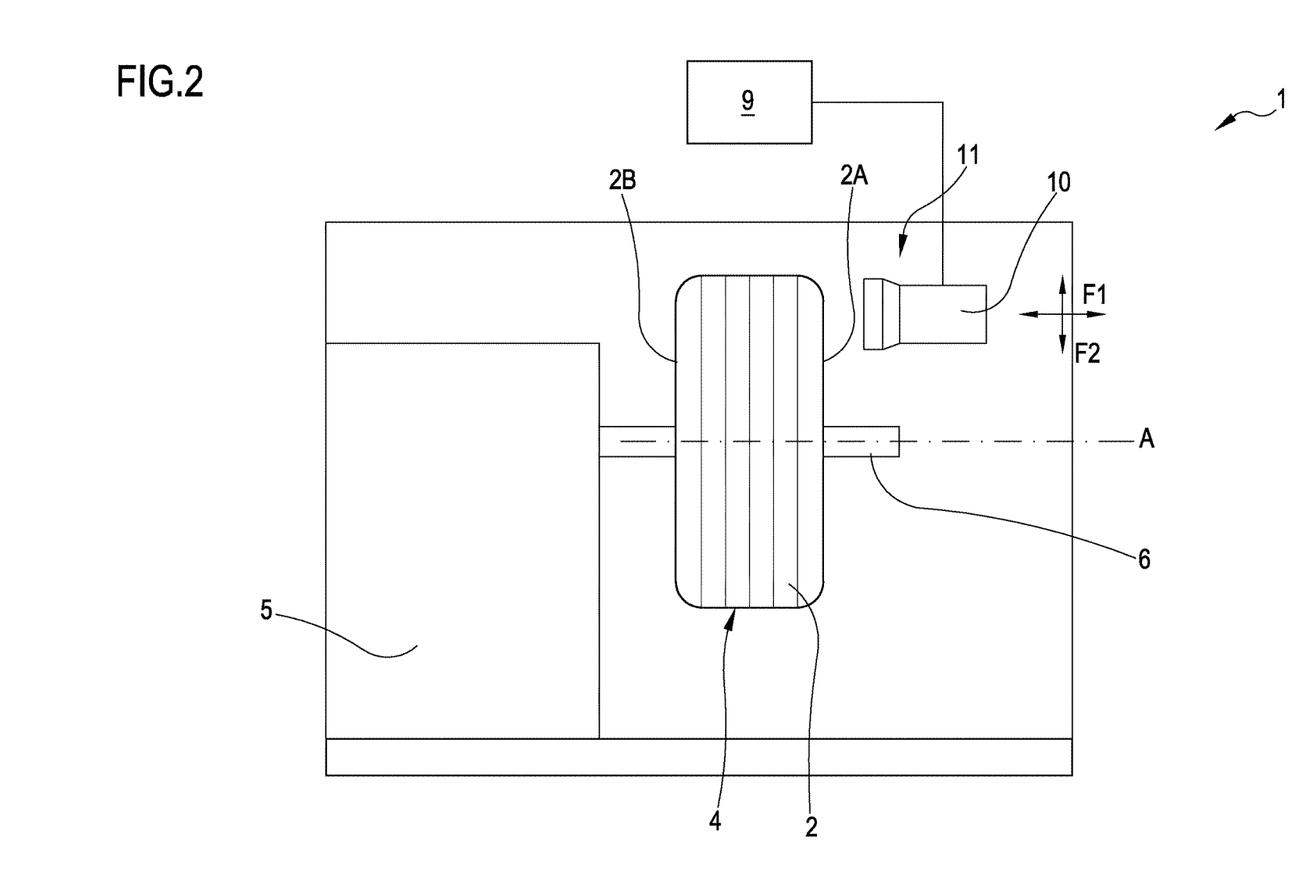
FIG. 2 shows a second embodiment of the apparatus according to the invention.

The apparatus 1 illustrated in FIG. 2 is a wheel balancing machine 4. The same reference numbers have been used for the elements of the balancing machine 1 corresponding to those present in the tyre mounting/demounting device 2. The balancing machine 1 comprises a base 5 intended to rest on the ground. Mounted on the base 5 there is a rotatable support 6 defined by a horizontal shaft, at the ends of which there are disposed support means, not illustrated in detail and known per se, intended to receive and support the rim 3 of the wheel 2, and a locking means, not illustrated in detail and known per se, which enables the rim 3 to be solidly constrained to the shaft 6. The shaft 6 is rotatable on the base 5 about a main axis A thereof and is connected to an electric motor, for example inside a casing of the base 5 and not illustrated. The motor is configured to rotate the shaft 6 and the wheel 4 together about the main axis "A" of the shaft 6 (which coincides with the main or rotation axis of the wheel 4). The balancing machine comprises devices, known per se and neither described nor illustrated, suitable for enabling the static and/or dynamic balancing of the wheel while the latter rotates about the main axis A.

The apparatus 1 further comprises a control unit 9 and a laser marking system 10, connected to said control unit 9.

In FIG. 2, the laser marking system 10 is positioned in such a way as to be able to operate on the right side wall 2A of the tyre 2.

However, in this embodiment as well it is in principle possible to dispose the laser marking system 10 in such a way that it can operate on the left side wall 2A of the tyre, or it is possible to use a movement and support means, not illustrated, capable of positioning a single laser marking system 10 either on the right or left relative to the tyre 2, so as to be able to operate on both of the side walls 2A, 2B. Alternatively, it is possible to use two laser marking systems, one for each side wall of the tyre.

The position of the laser marking system 10 is further adjustable along the directions F1 and F2, automatically or manually.

Essentially, the structure and functioning of the laser marking system 10, when the wheel maintenance apparatus is a balancing machine, are wholly analogous to what was described above for the case in which said apparatus is a tyre mounting/demounting device, and will thus not be repeated here.

The above-described system and method could also be applied to apparatus for checking the alignment of the wheels of a vehicle ("wheel aligners") and/or test lines for automobiles, for example test benches for brakes, suspensions or the like, without moving away from the invention described thus far and thus without requiring any inventive effort on the part of the person skilled in the art.

REFERENCE LIST 1 vehicle wheel maintenance apparatus
2 tyre
2A, 2B side walls of the tyre
3 rim
4 wheel
A main axis of the wheel
5 base of the vehicle wheel maintenance apparatus
6 rotatable support
7 column
8 mounting and demounting tool
9 control unit
10 laser marking system
11 screen
12 arm
20 carriage
F1, F2 directions of movement of the laser marking system

The invention claimed is:

1. A process for maintenance of vehicle wheels, the process comprising:
   mounting a wheel for vehicles on a support of an apparatus for maintenance of vehicle wheels, said wheel comprising a rim and a tyre; and
   uniquely identifying the tyre by:
   creating a digital code for uniquely identifying said tyre; and
   creating, using a marking system, at least one marking on the surface of a side wall of the tyre of said wheel, corresponding to the digital code previously created,
   wherein the digital code also comprises at least one piece of information relating to the wheel maintenance process.

2. The process according to claim 1, wherein the marking comprises at least one first portion of surface having a first optical reflectivity and at least one second portion of surface having a second optical reflectivity, said first optical reflectivity being different to the second optical reflectivity.

3. The process according to claim 1, wherein uniquely identifying the tyre also comprises: reading the marking on the surface of the side wall of the tyre, and recognising the corresponding digital code of the tyre, by means of an optical vision system.

4. The process according to claim 3, wherein the optical vision system is mounted fixed to the vehicle wheel maintenance apparatus.

5. The process according to claim 3, wherein the optical vision system is included in a portable device, for example a smartphone or a tablet.

6. The process according to claim 1, wherein the digital code is of the two-dimensional type.

7. The process according to claim 1, wherein the digital code is a QR code.

8. The process according to claim 1, wherein the marking system is of the optical type.

9. The process according to claim 1, wherein uniquely identifying the tyre also comprises:
   storing the digital code in a database,
   and:
   sharing at least one portion of said database with at least one further vehicle wheel maintenance apparatus and/or with at least one local and/or remote information technology system.

10. An apparatus for vehicle wheel maintenance, comprising:
    a base;
    a support mounted on the base and designed to receive and sustain a rim of a wheel of a vehicle;
    a marking system operatively active on a surface of at least one side wall of the tyre of said wheel, for marking said at least one side wall of the tyre;
    a control unit operatively connected to said marking system and designed for:
    creating a digital code for uniquely identifying said tyre;

controlling the marking system so that it creates at least one marking on the surface of the side wall of the tyre of said wheel, corresponding to the digital code previously created, wherein the digital code also comprises at least one piece of information relating to the wheel maintenance process.

11. The apparatus according to claim 10, wherein the marking comprises at least one first portion of surface having a first optical reflectivity and at least one second portion of surface having a second optical reflectivity, said first optical reflectivity being different to the second optical reflectivity.

12. The apparatus according to claim 10, wherein the support is rotatable on the base and the apparatus comprises a motor operatively connected to the rotatable support and designed to make said rotatable support and the wheel rotate about a main axis of said wheel; wherein the control unit is also designed to control the motor so that it makes the rotatable support and the wheel rotate.

13. The apparatus according to claim 10, wherein the marking system comprises a laser light source.

14. The apparatus according to claim 10, wherein the marking comprises a plurality of engravings or recesses on the surface of the side wall of the tyre.

15. The apparatus according to claim 10, wherein the digital code is of the two-dimensional type.

16. The apparatus according to claim 10, wherein the digital code is a QR code.

17. The apparatus according to claim 10, also comprising an optical vision system for reading the marking on the surface of the side wall of the tyre, recognising its corresponding digital code.

18. The apparatus according to claim 17, wherein the marking system and the optical vision system are integrated in the same optical marking and vision system.

19. The apparatus according to claim 10, wherein said apparatus is a wheel balancer or a device for mounting tyres on a rim and/or demounting tyres from a rim, or a wheel aligner device, or a test bed for brakes or suspensions, or an auto lift.

20. The apparatus according to claim 10, wherein the marking system is of the optical type.

* * * * *